Sept. 19, 1933.  E. GRAMSS  1,927,639
ELECTRIC INSULATOR
Filed March 12, 1930
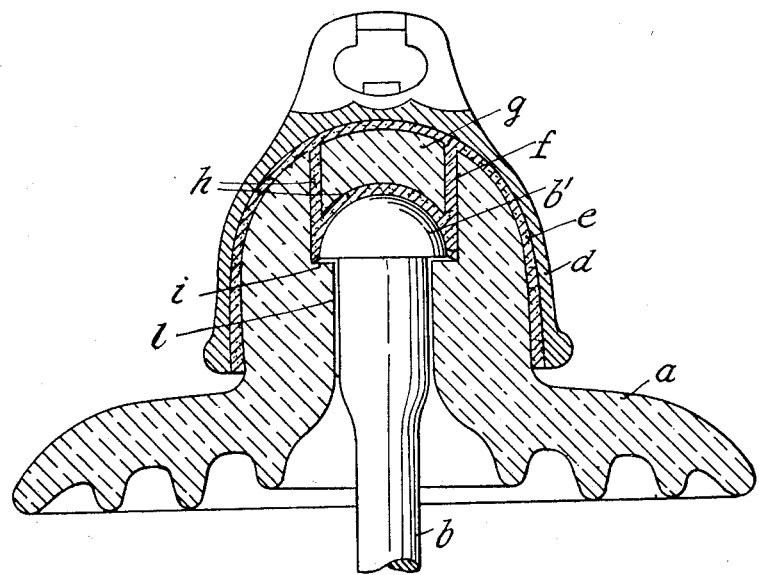
Inventor:
Ernst Gramss
by
Atty.

Patented Sept. 19, 1933

1,927,639

UNITED STATES PATENT OFFICE 1,927,639

ELECTRIC INSULATOR

Ernst Gramss, Stadtlengsfeld, Germany

Application March 12, 1930, Serial No. 435,308, and in Germany March 22, 1929

1 Claim. (Cl. 173—318)

My invention relates to electric insulators.

In reducing my invention to practice, I may provide a hole which extends throughout the insulator, with a shoulder for supporting the head of the pin, and fill in only the cavity above the head, or I may insert in the cavity a plug of porcelain or the like and fill in the clearance between the head and the walls of the cavity and the plug with the filler of ceramic material.

In the drawing affixed to this specification and forming part thereof an insulator made in accordance with my method is illustrated in axial section by way of example.

Referring now to the drawing, $a$ is the body of the insulator, which may be of porcelain, $b$ is the pin, $b'$ is its head, $d$ is a metal cap on the insulator, and $e$ is a layer of ceramic material, cement or the like, by which the cap is connected with the insulator.

The body $a$ of the insulator has a hole $l$ which extends throughout the insulator and is provided with an extension $f$ at its upper end, the shoulder $i$ between the two parts of the hole serving as a support of the head $b'$ of the pin $b$.

Insulator bodies having a hole for the reception of a pin, and a shoulder in the hole for a head of the pin to bear on, have already been suggested. It has also been suggested to fill in the hole above the shoulder and the head with tar or cement, or to close it at its upper end by a plug made of the same material as the body.

According to my invention I also provide a plug $g$ for closing the hole but I make the plug so long that it extends as far as the head $b'$ at its lower end, with a small clearance. The plug is made of a material which has similar properties as the material of which the body is made, preferably of the same material as the body $a$. The outside diameter of the plug $g$ is smaller than the inside diameter of the extension $f$, so that it has a clearance with respect to the extension $f$ and head $b'$ of the pin $b$.

The ends of the plug are preferably shaped in conformity with the contours of the head $b'$ and of the body $a$, respectively. The clearances between the plug $g$ and the extension $f$ and the head $b'$ are filled with ceramic material $h$ whose sintering temperature is below the melting point of the metal of pin $b$. The layer $e$ for securing the cap $d$ may also be of the same material. After the plug has been inserted and the clearances have been filled, the unit is burnt.

As the plug $g$ consists of a material which has similar properties to those of the material of the body $a$, or is of the same material, the strength of the plug is equal, or substantially equal, to the strength of the body, and greater than the strength of the filler in the clearance defined by the plug, the extension $f$ and the head $b'$. As the sintering temperature of the filler material is limited by the melting point of the pin $b$, the filler material is not as strong as the material of the other parts, and it will be understood that a substantial gain in overall strength would not be obtained by filling the extension $f$ with the comparatively weak filler, or by closing it by a plug of the stronger material of the body at its upper end only, as in the old insulator referred to. On the other hand, by inserting the plug $g$ whose strength is equal, or substantially equal, to that of the body $a$, and limiting the filler to the small clearances, the volume of strong material becomes a maximum, and the volume of weak material becomes a minimum, and the loss of strength due to the hole is made up for.

I wish it to be understood that I do not desire to be limited to the exact details of construction shown and described for obvious modifications will occur to a person skilled in the art.

I claim:

An insulator comprising a body having a hole, a shoulder in said hole, a pin adapted to be inserted in said hole, a head on said pin adapted to bear on said shoulder, a plug inserted in said hole above said head and made of a material having properties similar to those of the material of said body, said plug being of smaller size than the inside diameter of said hole and so long that its inner end is near said head, and a filler of ceramic material in the clearance between said plug, said hole and said head, whose sintering temperature is below the sintering temperatures of the materials of said body and said plug and the melting point of said pin.

ERNST GRAMSS.